United States Patent [19]
Laurent

[11] Patent Number: 5,683,643
[45] Date of Patent: Nov. 4, 1997

[54] VULCANIZATION OF TIRES BY IMPARTING HEAT FROM THE INSIDE

[75] Inventor: Daniel Laurent, Meylan, France

[73] Assignee: Sedepro, Paris, France

[21] Appl. No.: 455,649

[22] Filed: May 31, 1995

[30] Foreign Application Priority Data

Jun. 9, 1994 [FR] France .................. 94 07165

[51] Int. Cl.[6] ................................ B29C 35/04
[52] U.S. Cl. ............... 264/315; 137/341; 264/326; 264/DIG. 46; 264/40.6; 425/41; 425/42; 425/DIG. 13; 425/143
[58] Field of Search ................ 264/315, 326, 264/40.6, DIG. 46; 425/41, 42, DIG. 13, 143, 144; 137/340, 339, 341

[56] References Cited

U.S. PATENT DOCUMENTS 3,924,981 12/1975 Sarumaru ................... 425/41

5,186,950 2/1993 Mauro et al. ................ 425/41
5,186,951 2/1993 Siegenthaler ............... 425/41

FOREIGN PATENT DOCUMENTS

| 0061850 | 10/1982 | European Pat. Off. . |
| 0246495 | 11/1987 | European Pat. Off. . |
| 0467314 | 1/1992 | European Pat. Off. . |
| 59-115827 | 7/1984 | Japan . |
| 2091173 | 7/1982 | United Kingdom . |

Primary Examiner—Mathieu D. Vargot
Attorney, Agent, or Firm—Brumbaugh, Graves, Donohue & Raymond

[57] ABSTRACT

An apparatus and method for heating and stirring a charge of a heat-exchange fluid under pressure for the curing of tires in which both a turbine and an electric motor for driving the turbine are enclosed within a fluid-tight enclosure and in which the turbine and the rotor and stator of the electric motor are entirely immersed within the heat-exchange fluid.

12 Claims, 2 Drawing Sheets

VULCANIZATION OF TIRES BY IMPARTING HEAT FROM THE INSIDE

BACKGROUND OF THE INVENTION

The present invention relates to the vulcanizing of tires. More specifically, it relates to a process and apparatus in which heat for vulcanization is imparted from inside the tire.

Various machines and processes are known which make it possible to effect the vulcanization of tires. Individual presses constitute one type of machine in which the tire remains under load for the entire period of time during which it is necessary to impart heat to it. This type of press assures the kinematics of the mold necessary for the introduction of a raw blank and for the discharge of a vulcanized tire. The mold used remains mounted in the press during the entire production cycle.

The systems in which several molds move one after the other in front of an encaser which assures the loading and/or unloading constitute another type of curing machine. U.S. Pat. No 4,728,274 provides an example thereof which will be referred to herein as a "collective" press or "collective" installation or system.

In all cases it is necessary to impart heat to the blank from both the outside and the inside and to subject the blank to a given molding pressure during the course of the vulcanization reaction. The invention concerns the imparting of heat from the inside. More particularly, it concerns those vulcanization systems which use a heat-exchange fluid both to transmit the heat necessary for the vulcanization reaction and to impart the molding pressure from the inside of the blank, the latter being held on the outside by a mold which defines the outer surface of the sidewalls and of the tread of the tire.

In the collective installations, the curing mold leaves the encaser and remains waiting for a given period of time in order to permit the vulcanization reaction to develop. A precalculated charge of heat-exchange fluid is introduced, generally in the encaser, and the source of fluid is then disconnected. It is desirable to establish a connection with the supply of heat-exchange fluid which can be easily removed when a blank, having just been introduced into a mold, leaves the encaser. It is preferable to have an "onboard" installation (that is to say one moving with the mold), which is capable of assuring the mixing and the regulation of the temperature of the heat-exchange fluid.

The size of the devices used up to now in order to assure the molding and the imparting of heat from the inside of the tire raises a problem for which there is no satisfactory solution in the present state of the art. This problem is particularly acute in the second type of machines, to the extent of making that type less interesting even though it has the advantage of a better utilization of the mechanics of the animation of the molds.

SUMMARY OF THE INVENTION

The present invention provides a solution for this problem by proposing a very compact system which, while making it possible to concentrate the means necessary for heating and stirring the heat-exchange fluid more on the inside of the space available between the beads of a tire, leaves greater freedom for the design of the vulcanization presses or encasers used to close and/or to open the vulcanization molds.

The invention proposes a unit for the heating and stirring of a charge of heat-exchange fluid under pressure which is used for the curing of tires, comprising a turbine driven by an electric motor, said turbine and said electric motor, including both the rotor and the stator of the latter, being enclosed in a fluid-tight enclosure containing said fluid so that there is no rotating shaft passing through the wall of the enclosure in order to effect the driving of the turbine.

From another standpoint, the invention proposes a process for the vulcanization of a tire in which the imparting of heat from the inside of the tire is effected by causing a heat-exchange fluid to circulate within the inner cavity of the tire by means of a turbine driven by an electric motor contained completely within said heat-exchange fluid, and by reheating said heat-exchange fluid, at least in part, because of losses due to the heating of said electric motor. In this way, the overall energy yield of the vulcanization is improved.

DESCRIPTION OF THE DRAWINGS

The following figures illustrate one embodiment of the invention which makes it possible clearly to understand its operation and to grasp all the advantages thereof.

DESCRIPTION OF PREFERRED EMBODIMENTS

Figure 1:
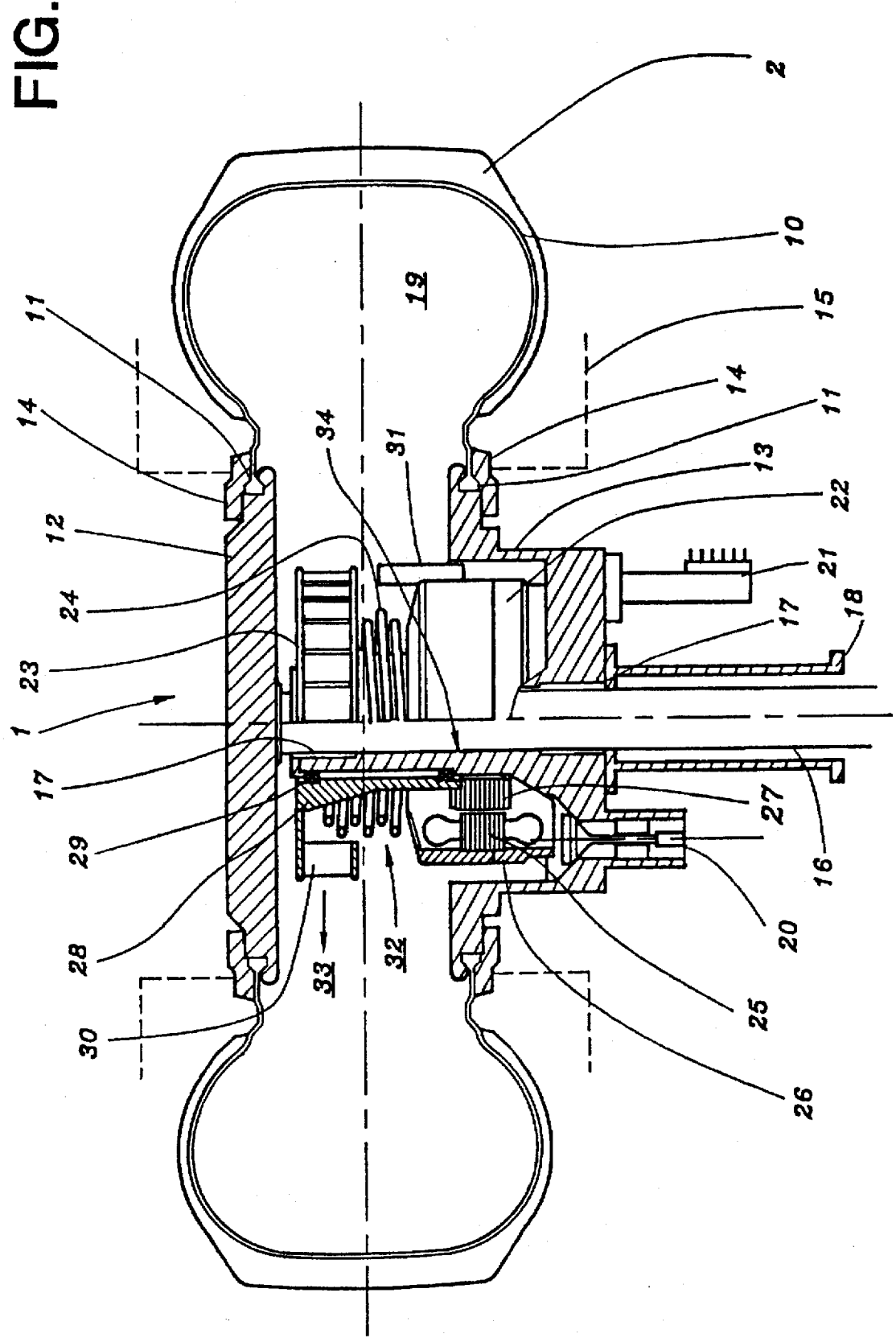
FIG. 1 shows the unit of the invention during vulcanization.

FIG. 1 shows a unit 1 in accordance with the invention as it appears during the operation of the vulcanization of a tire 2. In order to illustrate the invention, an application thereof to a process using a bladder 10 to contain the said heat-exchange fluid during the curing of the tire will be described. The heat-exchange fluid is preferably an inert gas, such as for example, nitrogen.

The vulcanization bladder 10 is provided with two beads 11. The latter are anchored on two plates 12 and 13 by means of two flanges 14. The dashed lines 15 symbolize a conventional mold for molding the outer surface of a tire.

The plate 13 has a bore in its center within which a freely sliding rod 16 is mounted, the rod furthermore being fastened to the plate 12. Two joints 17 assure a seal between the rod 16 and the plate 13. The two plates 12 and 13, together with the bladder 10, form a fluid-tight enclosure 19 which may contain a heat-exchange fluid.

The plate 13 has an automatically closing valve 20 which permits the introduction or extraction of the heat-exchange fluid into and from the enclosure 19 and makes it possible to maintain a given amount of heat-exchange fluid isolated within said enclosure 19, as well as the placing under pressure of said fluid. Finally, the plate 13 also comprises a hermetic electric connector system which supplies the power for the electrical apparatus arranged within the enclosure 19. A sheath 18 assures the protection of the rod 16, while permitting the mounting of the plate 13 on the frame of the machine and/or attachment to the mold 15. We may furthermore point out that the mold is designed and/or mounted in the machine in such a manner as to withstand the internal pressure prevailing in the enclosure 19 during the vulcanization.

In its central part, FIG. 1 has a half cross section (left-hand half) and a half view (right-hand half) showing an electric motor 22 and a turbine 23. Means for heating the heat-exchange fluid are also arranged within said enclosure 19 itself, on the path of flow of said fluid; in this case, it is an electric resistor 24. The stator 25 of the motor 22 is mounted on a housing 26, in its turn fastened on the plate 13. The rotor 27 of the motor 22 is mounted on a tube 28, in its turn mounted on rollers 29 held on a hollow shaft 34 which forms a single piece with the plate 13. The tube 28 supports and drives the turbine 23, which consists of buckets 30.

The rotation of the turbine 23 causes a circulation of the heat-exchange fluid in the direction indicated by the arrows 32 and 33. The fluid, which is circulated in the direction indicated by the arrow 32, reaches the central part of the unit 1 where it passes in heat exchange relationship with the electrical resistor 24, the turns are substantially concentric to the tube 28 but are shifted somewhat one from the other so as to improve their heat exchange relationship with the stream of heat-exchange fluid. After a brief path in the heating zone around the turns of the electrical resistor 24, the heat-exchange fluid is circulated radially outwardly by the turbine 23 in the direction indicated by the arrow 33.

The stream of fluid also covers the entire housing 26 of the motor 22, so as to limit the heating thereof. All the components concerned, in particular the motor 22 and the bearings 29, are designed to operate normally at the temperatures customary for the vulcanization of tires, namely temperatures on the order to 150° C. to 180° C.

Figure 2:
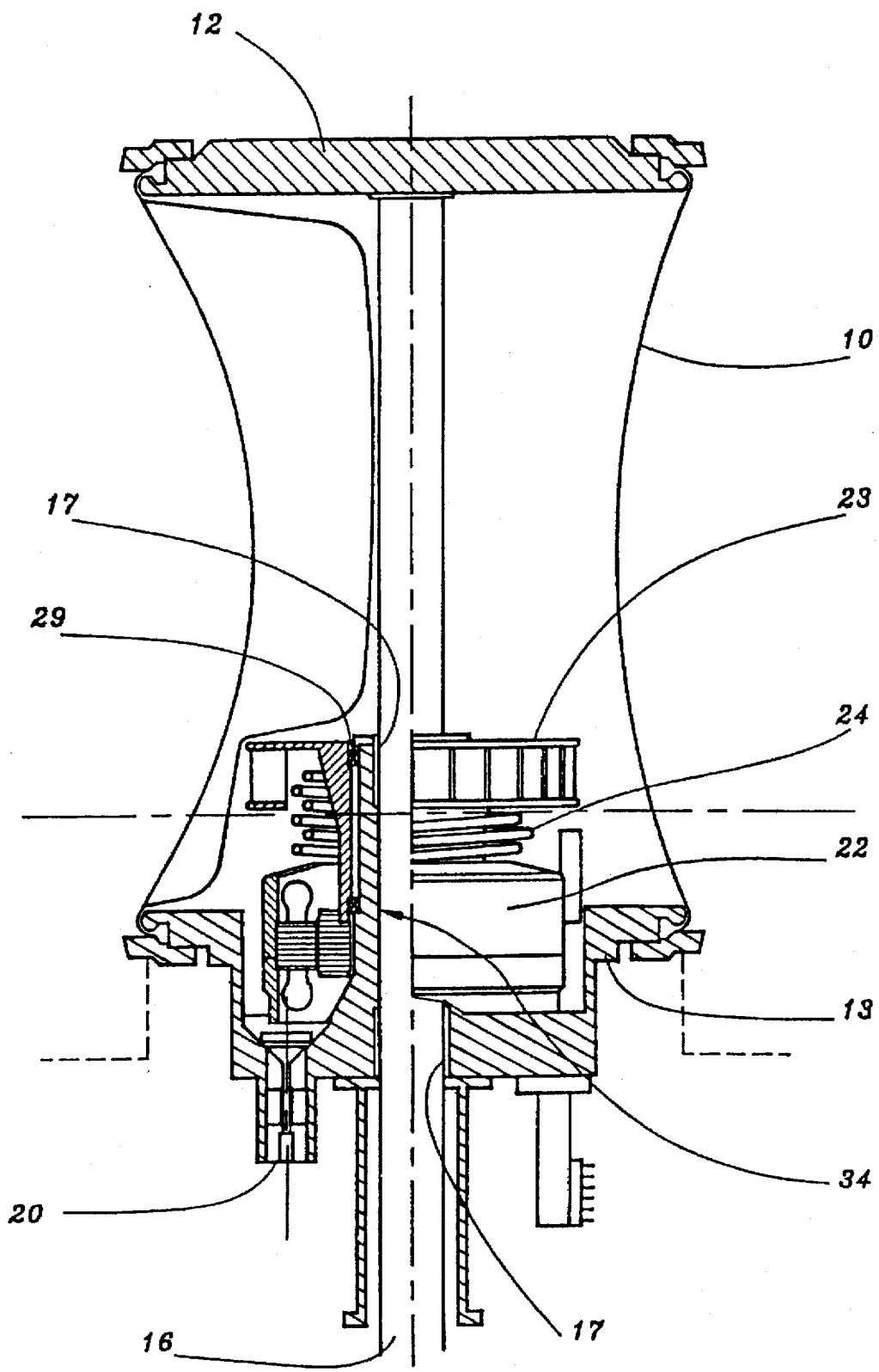
FIG. 2 shows the unit of the invention in a configuration which it can assume outside of the periods of vulcanization.

It is known that, in order to be able to mount a raw blank on a bladder vulcanization mechanism, or in order to be able to separate a vulcanized tire from said bladder, it is necessary to be able to spread said bladder out in the inner cavity of the tire, and it is necessary to be able to fold it until it is contained within the space located radially to the inside of the beads. The spreading out as well as the folding of the bladder are greatly facilitated if the machine used comprises means which assure a relative movement apart and towards each other of the plates 12 and 13 which support the bladder 12 (see FIG. 2).

Preferably, the seal between the movable plates 12 and 13 is preserved during the relative movement between plates 12 and 13. This is the reason why the unit 1 is equipped with joints 17. It is then possible to place the enclosure 19 under a vacuum while moving the plates 12 and 13 apart in order to facilitate the folding of the bladder 10.

It is preferable to assure the control of the relative movement of the two plates 12 and 13 by mechanical members which engage it on one side of the unit 1 in order not to interfere with the passage of the tire from the other side of the unit 1. Due to the hollow shaft 34, which leaves a free passage from one side of said unit 1 to the other, the center of said unit (that is to say, the central zone including the rotary shaft of said turbine) comprises a space available for any members. This passage is used here to mount the rod 16 which connects the upper plate 12 to the control means located on the lower side of the unit 1.

Due to the invention, no seal need be provided between the motor 22 and the turbine 23. The elimination of a sealing joint is always an advantage. In the particular embodiment described here, the turbine 23 and the hollow shaft 34 being both contained within the enclosure 19, the drive of the turbine in rotation does not require providing a rotary joint on a shaft of large diameter, namely that corresponding substantially to the diameter of the rollers 29.

We may note that the rod 16 does not turn with respect to the plate 13. The locating of a seal (joints 17) between parts experiencing pure axial sliding, without relative rotation, raises no problem as to efficiency or reliability, contrary to seals between rotating parts, on large diameters, which are subject to relatively high linear velocities.

Furthermore, there is only one passage through the plate for the heat-exchange fluid and it is formed by the automatic closing valve 20. There is no pump, pipe or motor offset on the outside of the enclosure 19, which would require at least another passage through one of the plates 12 and 13 for the heat-exchange fluid. This considerably simplifies the design of the press supporting the mold or the support maintaining the mold after the closing of the latter.

In addition to greater mechanical simplification, the invention also makes it possible to carry out a vulcanization process which permits recovery of the heat losses of the motor 22 driving the turbine 23. An electric resistor 24 which is contained within said heat-exchange fluid is preferably employed, and the temperature of said vulcanization fluid is regulated by controlling the flow of heat dissipated by said resistor 24.

In the event that the enclosure 19 is isolated during the curing operation, the charge of heat-exchange fluid is calculated in such a manner as to obtain a suitable pressure at the operating temperature.

The present invention provides a solution which has numerous advantages, both from a mechanical point of view and from the point of view of the energy balance. It can be used in numerous types of different machines, whether in individual curing presses or in collective installations, or in curing with or without bladder.

The invention makes it possible to construct a device for the stirring of the vulcanization fluid which is completely integrated in the center of a mold, located completely within an imaginary cylinder inside the beads (except, of course, the bladder when it is spread out) and practically entirely within planes perpendicular to the axis of rotation and tangent to the sidewalls of the vulcanized tire. It can also be profitably employed in order to construct an off-center circulator of a mold.

I claim:

1. A unit for using a tire including means for heating and stirring a charge of a heat-exchange fluid under pressure, for the curing of the tire, the heating and stirring means comprising a fluid-tight enclosure containing said fluid and including a central zone for the free passage of said fluid, a turbine and an electric motor for driving the turbine, said turbine and said electric motor, including both the rotor and the stator of the electric motor, being enclosed in the fluid-tight enclosure containing said fluid, the turbine being located in said central zone, and means mounting the stator within the fluid-tight enclosure and in operative relation to the rotor such that the heat exchange fluid is at least partly reheated due to heat losses from both the rotor and stator of said electric motor.

2. A unit according to claim 1, including additional means for the heating of said fluid, said additional heating means being arranged within said enclosure in a path of flow of said fluid.

3. A unit according to claim 1, including a vulcanization bladder having two anchoring beads, and in which said enclosure comprises said vulcanization bladder and a first and a second plate on which the anchoring beads are mounted, and comprising means which impart a relative movement to such plates away from and towards each other and sealing means between the plates and the means for imparting relative movement to the plates for maintaining a seal during relative movement between the plates.

4. A unit according to claim 3, in which the free passage occupying the central zone accommodates a hollow shaft extending axially into the free passage from one of said plates and in which the means which impart relative movement to the plates includes an axially movable rod which extends through the hollow shaft and the plate from which the hollow shaft extends to the other plate for the movement of said other plate, the hollow shaft supporting the turbine thereon.

5. A unit according to claim 3, in which one of said plates has an automatically closing valve which permits the introduction or removal of said fluid and makes it possible to maintain a given quantity of heat-exchange fluid isolated within said enclosure.

6. A unit according to claim 3, in which said bladder is anchored directly on said plates.

7. A process for the vulcanizing of a tire comprising imparting heat to the tire from the inside of the tire by causing a heat-exchange fluid to circulate in the inner cavity of the tire by means of a turbine driven by an electric motor, the rotor and the stator of said electric motor being mounted entirely immersed by the heat exchange fluid, the turbine being located in a flow passage in a central zone of the cavity and reheating said heat-exchange fluid at least in part due to heat losses from both the rotor and the stator of said electric motor.

8. A process according to claim 7, in which heat is also imparted to the heat-exchange fluid by an electric resistor contained within the central zone of said heat-exchange fluid and the temperature of said vulcanization fluid is regulated by the heat flow dissipated by said resistor.

9. A process according to claim 7, in which a bladder mounted on plates contains said heat-exchange fluid during the curing of the tire.

10. A process according to claim 9, including moving said plates with respect to each other, the bladder and said plates defining a fluid-tight enclosure whatever the relative position of the plates.

11. An apparatus for using a tire including means for heating and stirring a heat-exchange fluid under pressure for the curing of the tire, the heating stirring means comprising a fluid-tight enclosure defined in part by a pair of walls, at least one of which is movable relative to the other, a hollow shaft extending into a central zone of the enclosure from one of the walls, an axially movable rod extending through the said one wall and hollow shaft to the opposite wall for the movement of said opposite wall relative to the said one wall, a turbine mounted for rotation on said hollow shaft, an electric motor having a rotor and stator within said enclosure, a support mounted to one of the walls for mounting the stator in operative relation to the rotor and within the enclosure, such that the heat exchange fluid is at least partly reheated due to heat losses from both the rotor and stator of said electric motor, a sleeve rotatably mounted on the hollow shaft for accommodating the turbine and seals between the said one wall and the axially movable rod, and an hermetic electrical connection which supplies power to the electric motor.

12. An apparatus as set forth in claim 11, including a heat control means located within a flow passage of the central zone of the fluid-tight enclosure.

* * * * *

UNITED STATES PATENT AND TRADEMARK OFFICE
CERTIFICATE OF CORRECTION

PATENT NO.   : 5,683,643
DATED        : Nov. 4, 1997
INVENTOR(S)  : Laurent

It is certified that error appears in the above-indentified patent and that said Letters Patent is hereby corrected as shown below:

Col. 4, line 35, "using" should read --curing--.

Col. 6, line 5, "using" should read --curing--;
        line 7, "heating" should read --heating and--.

Signed and Sealed this

Twelfth Day of May, 1998

Attest:

BRUCE LEHMAN

*Attesting Officer*        *Commissioner of Patents and Trademarks*